UNITED STATES PATENT OFFICE 2,419,632

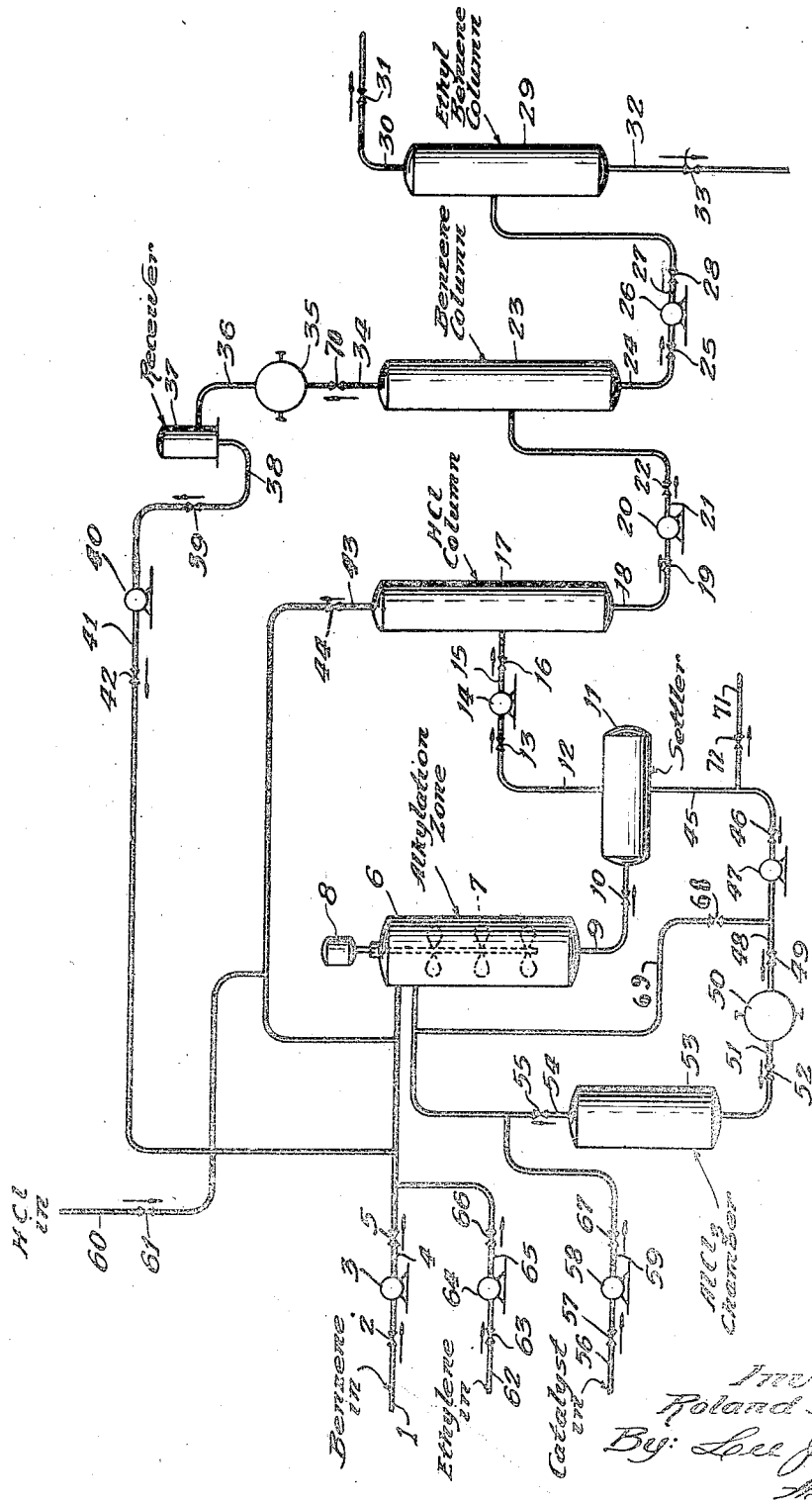

ALKYLATION OF CYCLIC HYDROCARBONS

Roland B. Day, Riverside, Ill., assignor to Universal Oil Products Company, Chicago, Ill., a corporation of Delaware Application April 29, 1944, Serial No. 533,312

5 Claims. (Cl. 260—671)

This application is a continuation-in-part of my co-pending application Serial No. 476,665, filed February 22, 1943.

This invention relates to the alkylation of an alkylatable cyclic hydrocarbon, and is more specifically directed to the use of a particular catalyst comprising an aluminum chloride hydrocarbon complex having an unusually high activity and selectivity for the desired reaction.

It is well known in the prior art that metal halide catalysts of the Friedel-Crafts type such as aluminum chloride promoted with a hydrogen halide are highly effective in accelerating the reaction between cyclic hydrocarbons such as aromatics with various olefins to form alkyl aromatics.

It has also been shown that various aluminum chloride-hydrocarbon complexes such as those formed by reacting aluminum chloride with an aromatic hydrocarbon or by reacting aluminum chloride with a paraffinic hydrocarbon have substantial activity for various hydrocarbon conversion reactions.

I have discovered that a catalyst having a high degree of activity and selectivity may be obtained by reacting aluminum chloride with an olefin hydrocarbon providing the aluminum chloride content of the resulting complex is maintained within the range of about 60 to about 85 weight per cent of the complex.

In one embodiment the present invention comprises a process for the alkylation of an alkylatable cyclic hydrocarbon which comprises subjecting a mixture of said hydrocarbon and an alkylating agent under alkylating conditions to the action of an aluminum chloride hydrocarbon complex formed by reacting aluminum chloride with an olefinic hydrocarbon and having an aluminum chloride content calculated as $Al_2O_3$ within the range of about 60 to about 85 weight per cent of the complex.

The catalyst of my invention may be prepared by interacting the requisite amount of aluminum chloride in the presence of a hydrogen halide or a substance affording some hydrogen halide under the conditions of preparation, thereby forming a mobile dark red or brown liquid which can be pumped readily into the reaction zone. When lower boiling olefins such as ethylene are used, the preparation may suitably be carried out at temperatures within the range of 100 to 250° F. and under superatmospheric pressure. The temperature of the catalyst preparation is dependent to a certain extent upon the type of olefin employed, lower temperatures being utilized when higher molecular weight olefins are used. I have also found that lower temperatures can be employed if olefins having more than one double bond per molecule are used in the catalyst preparation.

My invention is readily adaptable to the alkylation of cyclic hydrocarbons such as aromatic hydrocarbons including benzene, toluene, etc., or alicyclic hydrocarbons containing at least 5 carbon atoms in the ring such as methyl cyclopentane, cyclohexane, etc., with alkylating agents including olefins or alkyl halides such as propyl chloride, tertiary butylchloride, etc., and is particularly suitable for the alkylation of benzene with ethylene to produce ethylbenzene. The latter hydrocarbon has become an important raw material for the production of synthetic rubber since it can be readily dehydrogenated to form styrene which is subsequently polymerized with butadiene to form high molecular weight polymers having physical properties resembling those of natural rubber. Various other alkyl aromatics such as isopropylbenzene which are employed as blending agents in aviation gasolines, may be formed by the process of my invention.

The process of my invention may be conducted in various ways, the most feasible being the use of a mechanically agitated reaction zone in which the preformed catalyst contacts the hydrocarbon reactants followed by the removal of the reaction product to suitable separating equipment wherein the desired reaction product is separated from the unconverted material, the latter being recycled to the reaction zone. The alkylation reaction is carried out by introducing a mixture of the desired cyclic hydrocarbon and alkylating agent, the former being in substantial molar excess of the latter, into the reaction zone containing the liquid catalyst and relatively small amounts of a hydrogen halide, said reaction zone being maintained at a temperature of from about 0 to about 250° F. under pressure sufficient to maintain the hydrocarbon in a substantially liquid phase.

The amount of hydrogen halide ordinarily employed is of the order of about 0.5 to about 10 and preferably from about 1.0 to 3.0 mol per cent of the hydrocarbon reactants. In order to maintain the aluminum chloride concentration in the complex between the desired limits of 60 to about 85 weight per cent, a small portion of fresh complex may be continually added or a regulated portion of the spent catalyst may be withdrawn from the reaction zone, passed through a heating zone into a chamber containing granular aluminum chloride to replenish the aluminum chloride in the complex and thereafter recycling the complex to the reaction zone.

The operating details and the method of conducting the process of my invention are more clearly set forth in the description of the accompanying diagrammatic drawing which illustrates in conventional side elevation one type of apparatus in which the objects of the invention may be accomplished.

For simplification the description of the drawing has been restricted to a reaction wherein benzene is alkylated with ethylene. However, it is not intended that this restriction place any undue limitation on the broad applicability of my invention.

Referring to the drawing, the charging stock in the present instance, benzene is admitted into the system through line 1 containing valve 2 into pump 3 and discharged through line 4 containing valve 5, commingled with ethylene and hydrogen chloride obtained as hereinafter set forth, and the mixture introduced into alkylation zone 6 wherein the alkylation of the benzene with the ethylene is accomplished in the presence of a preformed aluminum chloride hydrocarbon complex having an aluminum chloride content calculated as $Al_2O_3$ in between about 60 to about 85% by weight of the complex. The molar ratio of benzene to ethylene may be maintained within the range of 2 to about 20 and preferably between about 3 to about 8. Zone 6 consists preferably of a mechanically agitated reaction zone containing, for example, a stirring device 7 operated by motor 8. Obviously, however, any other apparatus which is effective for producing intimate contact between the liquid catalyst and the hydrocarbon reactants may be employed. Alkylation zone 6 may be equipped with suitable cooling means not shown in order to control the exothermic alkylation reaction. The reaction products from zone 6 are directed through line 9 containing valve 10 into settler 11 wherein the catalyst is separated from the hydrocarbon reaction products. The catalyst thus separated is withdrawn from settler 11 through line 45 containing valve 46 into pump 47. The discharge from this pump is split into two streams, the first of said streams passing through line 67 containing valve 68 and thereafter into alkylation zone 6. The remaining portion is directed through line 48 containing valve 49 into heat exchanger 50 and thereafter through line 51 containing valve 52 into aluminum chloride chamber 53.

Chamber 53 comprises an aluminum chloride supply zone containing therein a bed of solid granular aluminum chloride. By passing regulated portions of the spent catalyst from settler 11 through the granular aluminum chloride bed in chamber 53 and recycling this stream through line 54 containing valve 55 into reaction zone 6, the aluminum chloride concentration of the catalyst in said reaction zone can be easily maintained within the desired range of 60 to 85% by weight of the complex. The initial charge of catalyst formed by reacting aluminum chloride with ethylene in the presence of hydrogen chloride is introduced into the system through line 56 containing valve 57 into pump 58 which discharges through line 59 and valve 61 into line 54 through which it is passed to reaction zone 6. However, the initial catalyst charge may be formed in situ by placing the requisite amount of aluminum chloride into the reaction zone and passing ethylene and hydrogen chloride through the zone until the $AlCl_3$ is converted into the complex. The respective amounts of catalyst sent through chamber 53 and by-pass line 69 are regulated in a manner such that the aluminum chloride concentration of the total catalyst in reaction zone 6 is maintained within the desired range concentration.

The hydrocarbon reaction products from zone 6 are withdrawn from settler 11 through line 12 containing valve 13 into pump 14 and are directed to line 15 containing valve 16 into column 17 wherein the hydrogen chloride employed as a promoter for the alkylation reaction is separated from the hydrocarbon reaction products. The separated hydrogen chloride is removed overhead through line 43 containing valve 44 and recycled to the alkylation zone. The reaction products comprising ethyl benzene, a small amount of polyethylated benzene and unconverted benzene are withdrawn through line 18 containing valve 19 into pump 20 which discharges through line 21 containing valve 22 into column 23 wherein the unconverted benzene is separated from the remaining hydrocarbons. The unconverted benzene is removed overhead through line 34 containing valve 70 and passes through condenser 35, line 36 into receiver 37. Pump 40 takes suction on receiver 37 through line 38 containing valve 39 and recycles the unconverted benzene to the system through line 41 containing valve 42. The bottoms of column 23 comprising ethylbenzene and minor proportions of more highly alkylated benzenes are withdrawn through line 24 containing valve 25 into pump 26, discharged through line 27 and valve 28 into fractionating column 29 wherein the ethylbenzene is removed overhead through line 30 containing valve 31, cooled, condensed and recovered as a product of the reaction. The more highly alkylated benzenes are withdrawn through line 32 containing valve 33 and may be recovered as a product of the reaction or may be further treated, for example, in a dealkylation operation, admixing the polyalkylated benzenes with benzene and contacting the mixture with a dealkylation catalyst such as silica-alumina to further augment the yield of the ethylbenzene. The original charge of hydrogen chloride is introduced through line 60 containing valve 61 into line 43 through which it passes into alkylation zone 6 in admixture with the benzene and ethylene charged to the alkylation zone. Ethylene is introduced into the system through line 62 containing valve 63 into pump 64 which discharges through line 65 containing valve 66 into line 4 wherein it is commingled with the benzene charge as hereinbefore set forth. A portion of the spent catalyst withdrawn from settler 11 may be removed from the system through line 71 containing valve 72 and thereafter treated to recover the aluminum chloride and hydrocarbons contained therein. By removing a portion of the spent catalyst through line 71 and replacing the removed portion of the catalyst by freshly prepared catalyst through line 56, the aluminum chloride concentration in the alkylation zone may be maintained at the desired level.

The following examples illustrate the commercial utility and feasibility of this invention. However, it is not intended that the broad scope of the invention be limited to the exact operating conditions hereinafter set forth.

*Example I*

An $AlCl_3$-hydrocarbon complex was prepared by reacting the $AlCl_3$ with ethylene in the presence of hydrogen chloride. A dark red mobile complex was formed having an AlCl₃ content (determined as Al₂O₃) of about 75 weight per cent. This catalyst is used for the alkylation of benzene with ethylene in a system comprising a mechanically agitated reaction zone of the turbo mixer type, a settling zone, means for recycling the catalyst, a part of which is contacted with aluminum chloride to maintain the concentration in the reaction zone, and a fractionating system for recovering desired products from the hydrocarbon reaction products.

A mixture of benzene and ethylene (molar ratio of benzene to ethylene 5:1) is heated to 150° F., commingled with about 3 mol per cent of hydrogen chloride and introduced into the reaction zone containing the catalyst previously mentioned. The products from the reaction zone indicate that about 96 mol per cent of the ethylene reacts with the benzene to form ethylbenzene.

*Example II*

When the same mixture of reactants is subjected under similar conditions of operation to the action of a catalyst containing about 85 weight per cent of aluminum chloride (calculated as Al₂O₃), only about 30% of the ethylene reacts with the benzene to form the desired mono-ethylated benzene, the remainder reacting to form polyethylated benzenes and polymers.

*Example III*

When repeating Example I using the same charging stock and operating conditions but a catalyst containing 60% of aluminum chloride (calculated as Al₂O₃) the amount of alkylation is very low, the yield of ethylbenzene being about 12 mol per cent of the ethylene charge, and most of the remaining ethylene being polymerized to form high boiling polymers.

I claim as my invention:

1. A process for the alkylation of an alkylatable cyclic hydrocarbon which comprises subjecting an alkylatable cyclic hydrocarbon and an alkylating agent under alkylation conditions to the action of a catalyst comprising an aluminum chloride-hydrocarbon complex formed by the interaction of aluminum chloride and an aliphatic olefin and having an aluminum chloride concentration above 60 but below 85 weight per cent of the complex.

2. A process for the alkylation of an aromatic hydrocarbon which comprises subjecting an aromatic hydrocarbon and an olefin under alkylation conditions to the action of a catalyst comprising an aluminum chloride-hydrocarbon complex formed by the interaction of aluminum chloride and an aliphatic olefin and having an aluminum chloride concentration above 60 but below 85 weight per cent of the complex.

3. A process for alkylating an aromatic hydrocarbon with an olefin comprising subjecting an aromatic hydrocarbon and an olefin in the presence of hydrogen chloride at a temperature within the range of about 0 to about 250° F. and in substantially liquid phase to the action of a catalyst comprising an aluminum chloride-hydrocarbon complex formed by the interaction of aluminum chloride and an aliphatic olefin, said complex having an aluminum chloride concentration above 60 but below 85 weight per cent.

4. A process for producing ethylbenzene which comprises subjecting benzene and ethylene under alkylation conditions to the action of a catalyst comprising an aluminum chloride-hydrocarbon complex formed by the interaction of aluminum chloride and an aliphatic olefin, said complex having an aluminum chloride concentration above 60 but below 85 weight per cent.

5. A process for producing ethylbenzene which comprises alkylating benzene with ethylene in a reaction zone containing a catalyst comprising a preformed aluminum chloride-hydrocarbon complex formed by the interaction of aluminum chloride and an aliphatic olefin in the presence of hydrogen chloride, said catalyst having an aluminum chloride concentration above 60 but below 85 weight per cent of the complex, withdrawing a portion of said catalyst from said reaction zone, contacting at least a portion of said withdrawn catalyst with aluminum chloride to dissolve aluminum chloride therein, and thereafter returning a sufficient portion of catalyst containing aluminum chloride dissolved therein to the reaction zone to maintain the aluminum chloride concentration of the complex in the reaction zone at above 60 and below 85 weight per cent.

ROLAND B. DAY.

REFERENCES CITED

The following references are of record in the file of this patent:

UNITED STATES PATENTS

| Number | Name | Date |
|---|---|---|
| 2,198,595 | Amos et al. | Apr. 30, 1940 |
| 2,306,261 | Crawford et al. | Dec. 22, 1942 |
| 2,338,711 | d'Ouville et al. | Jan. 11, 1944 |
| 1,971,301 | Haeuber | Aug. 21, 1934 |